US005785751A

United States Patent [19]

Bashlykov et al.

[11] Patent Number: 5,785,751
[45] Date of Patent: Jul. 28, 1998

[54] COMPOSITION OF HYDRAULIC CEMENT

[75] Inventors: Nikolay Fedorovich Bashlykov, Himky; Sergey Alekseevich Zubehin, Podolsk; Valery Nicolaevich Serduk, Moscow; Vicheslav Rovimovitch Falikman, Dolgoprudniy; Boris Emmanuilovich Yudovetch, Moscow, all of Russian Federation; Jaime Moreno, Chicago, Ill.; Claudio Augusto Eberhardt, Talalpan, Mexico; Alfonso Cadaval; Nagmet Suleimanov-Gonzalez, both of Madrid, Spain; Shahviran Teimurogly Babaev, Moscow, Russian Federation

[73] Assignee: Cement Technology Corporation, Chicago, Ill.

[21] Appl. No.: 632,851

[22] Filed: Apr. 16, 1996

[51] Int. Cl.$^6$ .................................................. C04B 07/04
[52] U.S. Cl. ...................... 106/725; 106/732; 106/735; 106/786; 106/823
[58] Field of Search ......................... 106/715, 724, 106/725, 732, 735, 786, 774, 775, 776, 823, 727

[56] References Cited

U.S. PATENT DOCUMENTS 4,238,236  12/1980  Falcoz et al. .......................... 106/725
5,478,391  12/1995  Babaey et al. .

*Primary Examiner*—Paul Marcantoni
*Attorney, Agent, or Firm*—Palmatier & Zummer

[57] ABSTRACT

A composition of hydraulic cement is disclosed, having low water demand, high strength and low fragility. The cement comprises finely ground Portland cement clinker, calcium sulfate and a dry modifier containing an organic water reducing component in a weight percent ratio of 91 to 97:2 to 7:0.085 to 4, respectively. The clinker particles comprise three fractions, I, II and III chemically bonded with the organic water reducing component and having respective particle sizes: I—0.05 to 10 mkm in a weight percent of 15.3 to 34.3; II—10.1 to 30 mkm in a weight percent of 37.2 to 77.5; III—30.1 to 80 mkm in a weight percent of 4.2 to 19.6; plus a fraction IV—having a particle size more than 80 mkm in a weight percent less than 4.9 and free of the modifier. The calcium sulfate comprises a fraction of particles of a size 0.5 to 15 mkm, free of the modifier. The dry modifier is chemically bonded with the three clinker fractions in the following weight percent quantities: I—0.045 to 1.7; II—0.02 to 2.1; and III—0.01 to 0.2. The modifier includes a hardening accelerator: an alkali sulfate or a gel-former. The water reducing component comprises, for example, water soluble salts of: the condensate with formaldehyde of sulfated aromatic compounds, or sulfated, condensed heterocyclic compounds, or sulfated condensed monocyclic aromatic hydrocarbons, or sulfated condensed polycyclic aromatic hydrocarbons, or a condensate of β-naphthalenesulfonic acid with formaldehyde, or a sulfomethylised melamine resin, or a lignosulfonate, or a lignosulfonate compound modified with a carbamide-formaldehyde resin. The modifier covers the particles of franctions I–III.

20 Claims, No Drawings

COMPOSITION OF HYDRAULIC CEMENT

This invention relates to cement compositions characterized low water demand, high strength and reduced fragility.

BACKGROUND OF THE INVENTION

Hydraulic cements, to which Portland cement belongs, harden in water, under the alternate wetting and drying and in the air, under conditions that practically cover the whole sphere of human activity. Such cement, being one of the most important components of the national product of many countries, is constantly being improved in its technical properties. During the twentieth century, for instance, the average strength of commercial cements, evaluated by modern methods of testing, has increased by 3–4 times. But at the same time some cement plants in 1930 were producing cements just as strong as the modern average level. The strength increase of commercial Portland cement was based on using several technological factors:

1) Improvement of composition, particularly increase of tricalcium silicate, or alite, content in the clinker, with gross formula $3CaO \times SiO_2$ (or by reduced notation, adopted in cement chemistry, where $A=Al_2O_3$, $C=CaO$, $F_1=Fe_2O_3$, $H=H_2O$, $K=K_2O$, $M=MgO$, $N=Na_2O$, $R=R_2O=Na_2O+0.658 K_2O$, $S=SiO_2$ with gross formula $C_3S$) by lowering content of low activity dicalcium silicate, or belite $C_2S$; by increase of content of active, especially in the three first days of water hardening, mineral tricalcium aluminate $C_3A$; and by reducing the content of more passive mineral $C_4AF$. In the mid 1970s an optimum was reached: a composition of $C_3S$, 60–70 weight percent, $C_3A$, 6–8 weight percent;

2) Improving the structure of Portland cement clinker and, consequently, structure of the cement particles; cement having optimal performance properties being produced out of clinker with alite crystals having average sizes 25–40 mkm and belite, 30–40 mkm;

3) Improvement of particle size distribution of cement. In the mid 1960s it became evident the optimal ratio interval should be present between the percentages of the fine fraction of Portland cement (from 0.03 to 10 mkm) and its medium fraction (from 10.1 to 30 mkm), but coarse fraction (over 30 and especially over 60 mkm) should be present in the cement composition in a minimum content to prevent negative influence on its hydration and hardening by the water absorption from the products of hydration of fine and medium fractions. In this case the increase of the specific surface of cement, evaluated by the air permeability method suggested by F. M. Lea and T. Parker and now known as R. Blaine modification in America, Great Britain, France, Spain and Italy, as R. Dikkerhoff in Germany and as V. V. Tovarov and G. S. Khodakov in the ex-USSR, approximately from 2800–3000 to 4500 cm$^2$/g always led to a gain in strength because of acceleration of reaction to a gain with the water in age of 1–3 days proportionally to the increase of surface area. But this strength gain was lowered to 28 days, or in so-called standard strength, determined by mortar samples with cement: Sand ratio 1:3 and constant W/C=0.4–0.6, usually 0.5 or constant consistency (last rule was generally accepted in the beginning of the century and now it is in law just in ex-USSR countries, Mongolia and China only; and 4) Optimization of clinker:calcium sulfate relation in cement.

The abbreviation mkm, as used herein, means one micron, which is one millionth of a meter, equivalent to one thousandth of a millimeter.

All of the potentials of cement strength increase, due to these factors, were exhausted completely by the mid 1970s. Maximum standard strength obtained by application of all these factors reached 70–75 N/mm$^2$. But the commercially produced Portland cement had the guaranteed maximum standard strength about 10–15 N/mm$^2$ lower.

All of the factors limiting the cement strength are known. To such factors belong the increase of water demand and the fragility of the hydrated cement paste of cement of high specific surface. The most positive role in diminishing the fragility of hardened cement paste was played by active mineral additives, introduced into the cement up to 5–8%. Some reduction of water requirement, increased strength and lowering of fragility of cement paste was obtained by the introduction into the composition of the cement during the grinding of the clinker of plasticizers developed in 1940s in the form of 10–30% water solutions in quantities of 0.15–0.25 cement weight percent as calculated by dry substance. To such plasticizers belongs soluble salts of products of sulfation of condensed monocyclic aromatic compounds, mainly lignosulfonates, byproduct of sulfate method of cellulose and paper manufacture out of wood. Its introduction in liquid form into the cement in the mentioned quantities induced the reduction of water content in the paste of normal consistency determined by the Tetmeyer rod method up to 7–12%. But it does not cause adequate increase of the paste strength because of presence of lignosulfonates "reducing" components—sugars, that lower the degree of $C_3S$ hydration and especially formation of $C_3A$ hydration products.

About 20–25 years later, paper producers developed methods of separating sugars and using them for fabrication of yeasts, the quality of lignosulfonates increased significantly and introduction of such plasticizers in cement during its grinding resulted in getting standard cement strength gain up to 5–10 N/mm$^2$, that corresponds in general with the observed reduction of water demand.

Another method of strength increase was introduction into cement during grinding of about 5 weight percent of inoculating crystals for the improvement of the crystallization of two main types of hydrated formation in the structure of hardening cement paste: hydrosilicates and hydroaluminates, -hydrosulfoaluminates of calcium, so-called crystal-forming components, briefly crents. But not very high increase of standard cement strength values, about 10 N/mm$^2$, and limited resources of raw materials, in combination with the complexity of the manufacturing technology, prevented organization of commercial production for the cement industry.

So, in the beginning of 1980s the problem suddenly arose of the apparent limit in the strength of commercial Portland cement, about 65 N/mm$^2$. To overcome such a limit with the known technical solutions was not possible. Attempts to decrease the fragility of hardened cement paste in construction mortars and concretes by introduction of carbamide-formaldehyde resins to reduce water requirement of a cement by increasing the value of the uniformity coefficient of particle size distribution in the cement by partial or full separation of fractions larger than 20 mkm, and simultaneously to decrease the water demand and fragility of hardened cement paste, for instance, by introduction into the cement of an efficient fragility reducer in an emulsion form, polyvinyl alcohol, while the emulsative agent has hydrophobic and plasticizing effects in a cement paste, or by the covering of cement surface with hydrophobizier and simultaneous introduction into the cement of a soft phase, reducing fragility—technical carbon:—all of these methods showed very limited effects, not exceeding a total increase of the standard strength of cement by about 10–15 N/mm$^2$. A more radical solution with unexpected effect was needed.

Such possibilities appeared after development by R. Hattori in Japan and G. Aignesberger et al. in Germany of superplasticizers. Immediately after that technical solution was offered concerning introduction of water solutions of superplasticizers into cement during the grinding thereof in a quantity 0.6–1 weight percent as calculated for dry substance. As it is known such quantity of superplasticizers, introduced with the mixing water in cement paste or in concrete, reduces their water requirement by about 18–23 weight percent. But introduction into the mill of such a huge quantity of a superplasticizer in a water solution is practically not realizable, because it leads to sudden increase of cement movement along the mill, with a resulting reduction of impact numbers of the balls on each cement particle and a consequent decrease of the specific surface of the ground product. A separator is not able to correct this situation, because circulation cycles of the material in the mill become too numerous and the efficiency ratio of the mill is too low.

The closest to this invention is the hydraulic cement composition comprising: 1) portland type clinker; 2) calcium sulfate in the form of gypsum not over 3% as calculated by $SO_3$, or 6% as calculated by $CaSO_4 \times 2H_2O$; 3) dry modifier, comprising an organic water reducing component, for instance, melamine-formaldehyde type 0.1–1 weight percent and a retarder, in case of necessity, for instance, glucono-deltalactone 0.01–0.1 weight percent. Cement is produced by the intergrinding of the ingredients at a temperature lower than 90° C. This cement is proposed by Guy Pairon (Belgium) for preparing high strength injection grouts for injection of pre-stressed concrete sheathes. The advantage of this technical solution is the very high early compressive strength of the cement—over 30 $N/mm^2$ in 1 day, (the best grouts of Portland cement, up to 25 $N/mm^2$ without chloride accelerators), low water sorption—less than 3.5% by weight (best grouts utilizing Portland cement at this age have no less than 8%). But this cement does not have a low degree of fragility: relation of flexural strength of the grout, 4 $N/mm^2$, to the compressive strength, 30 $N/mm^2$, comprises 13%, which corresponds in general to the relation for ordinary Portland cement.

MAIN CONTENT OF THE INVENTION

This invention has the following purposes: further reduction of the water demand of hydraulic cement, increasing the strength and lowering the fragility for cement pastes, mortars and concretes. For general use, the suggested hydraulic cement of this invention, due to its high strength and reduced fragility, could incorporate up to 65 weight percent of mineral additions in the form of inactive thermally untreated material, or material having low activity, without unduly reducing the strength and fragility of the cement, in comparison with Prior high class Portland cement, for instance, corresponding to class 42.5 by pEN 197.

For the purposes of the invention, the composition of the hydraulic cement of low water demand, high strength and reduced fragility comprising Portland type clinker, calcium sulfate and dry modifier, including an organic water reducing component, in the weight relation of (91–97):(2–7):(0.085–4) respectively further comprises: said clinker ingredient in the form of three particle dimension fractions, chemically bonded with the organic water reducing component of dry modifier, said fractions having the following sizes: (I) from 0.05 to 10 mkm, 15.3–34.3 weight percent, (II) from 10.1 to 30 mkm, 37.2–77.5 weight percent, (III) from 30.1 to 80 mkm, 4.2–19.6 weight percent. Said composition also comprises a fourth (IV) dimension fraction free of the pure clinker particles having sizes from 80.1 to 200 mkm, free of dry modifier, in a quantity not over 4.9 weight percent;

Said calcium sulfate consists of particle dimension fractions from 0.5 to 15 mkm in a quantity of 2–7 weight percent, also free of dry modifier;

Said dry modifier is chemically bonded to the fractions I–III of the clinker ingredient and introduced into each of them in the following quantities: in fraction I 0.045–1.7 weight percent, in fraction II 0.02–2.1 weight percent, in fraction III 0.01–0.2 weight percent. In addition, the dry modifier is present as a separate fraction consisting of its own particles, free of the remaining ingredients, having sizes from 0.3 to 20 mkm in a quantity not over 0.2 weight percent. In all cases, the weight percents of the total cement weight are shown.

This cement is produced by intergrinding of all ingredients in the tube type mills.

Said three fractions of clinker particles include the dry modifier which is chemically bonded with them. The dry modifier comprises the organic water demand reducing component. All those fractions of clinker particles are conglomerates in which the clinker particles of the fine fraction I are covered over their external surfaces by the dry modifier which also is present internally in the defects of structures and in the pores. The particles of the medium fraction II are covered over their external surfaces by the dry modifier which also penetrates the particles to a depth up to 1.5 mkm. The particles of coarse fraction III are covered by the modifier over only the external surface thereof.

In the fraction I the dry modifier fills from 25 to 100% of internal pores of the clinker particles.

The clinker ingredient in the composition of the hydraulic cement in accordance with the invention comprises alite, belite, tricalcium aluminate and calcium aluminoferrites with the following weight relations: (45–75):(0–20): (0.5–12):(4–25) respectively.

As a variant, the clinker ingredient in the invention is a white Portland cement clinker.

Calcium sulfate in the composition of the hydraulic cement in accordance with the invention is in the form of calcium sulfate dihydrate, or calcium sulfate hemihydrate, or calcium sulfate anhydrite, or gypsum stone, or material from the group of so-called chemical gypsum, i.e., byproducts of chemical industry: phosphogypsum, borbogypsum or titanogypsum.

In a variant of the invention, said calcium sulfate is in the hemihydrate or anhydrate form, obtained from the dehydrated form in the process of intergrinding of the ingredients.

In the last mentioned version of the invention, said calcium sulfate fraction, with a particle size range of 0.5–15 mkm, the particles free of dry modifier, and additionally comprises conglomerate particles, comprising hemihydrate or anhydrate, dehydrated in the process of intergrinding with Portland type clinkers, and dry modifier chemically bonded with the hemihydrated or anhydrated calcium sulfate. The weight relation of the particles of calcium sulfate, free of dry modifier, and the particles bonded with and covered by the modifier over the surface of the particles is as follows, expressed in weight percent:(0.5–3.5):(1.5–4.5) respectively.

The dry modifier in the composition of the hydraulic cement according to the invention comprises a mixture of an inorganic part, including an accelerator of cement hardening, for instance, an alkali metal sulfate and/or a gel-former, such as microsilica, for instance, and also comprises an organic part, containing said water demand reducing component, consisting of: (a) water soluble salts of formaldehyde condensation with products of sulfation of monocyclic or polycyclic aromatic hydrocarbons, or (b) water soluble salts of the products of sulfation of heterocyclic compounds, or (c) water soluble salts of products of sulfation of condensed monocyclic or polycyclic aromatic hydrocarbons.

At the same time the groups of compounds (a), (b) or (c) are in the form of polymer, oligomer, monomer or mixtures thereof, bonded in the process of intergrinding of the ingredients to the external and internal surfaces of the particles of the clinker ingredient in the form of calcium containing chemosorptive associate compounds.

In a variant of the invention, the organic water demand reducing component of the dry modifier is one of the group (a) substances: an alkali or alkaline earth salt of products of the condensation of β-naphthalenesulfoacid with formaldehyde, comprising, in parts of its total quantity, not over 0.1 of a polymer fraction with an average-number molecular weight over 2300 Dalton, 0.3–0.6 of an oligomeric fraction with an average-number molecular weight of 1200–2300 Dalton and 0.3–0.6 of a light fraction with an average-number molecular weight 230–1199 Dalton.

In another variant of the invention, the organic water demand reducing component of the dry modifier is one of the group (b) substances: an alkaline earth salt of condensated sulfated melamine resin comprising, in parts of its total quantity not over 0.1 of a polymer fraction with an average-number molecular weight over 650 Dalton, 0.4–0.6 of an oligomeric fraction with an average-number molecular weight of 350–650 Dalton and 0.3–0.5 of a light fraction with average-number molecular weight of 220–349 Dalton.

In the next version of the invention the organic water demand reducing component of the dry modifier is one of the group (c) substances: technical lignosulfonate of an alkali or earth-alkali metal, or the products of its modification, for instance, by the carbamide-formaldehyde resin, characterized by an average-number molecular weight of 15000–25000 Dalton, or a mixture of substances from groups (a) and (c), in particular, mixture of technical lignosulfonate of an alkali or earth-alkali metal with an alkali or earth-alkali salt of the condensate of β-naphthalenesulfoacid with formaldehyde in a weight relation between them from 1:1 to 1:3.

In a variant of the invention, a hydraulic cement, besides comprising the main ingredients: Portland type clinker, calcium sulfate and a dry modifier, containing an organic water demand reducing component, comprises additionally a mineral ingredient, introduced by means of intergrinding it with the main ingredients in a quantity from 5 to 65% of the cement weight.

In another version of the invention said dry modifier, containing an organic water demand reducing component, comprises additionally a dry accelerator of cement hardening.

In a variant of the invention, said organic accelerator of cement hardening is selected from a group consisting of sodium or potassium sulfate, sodium or potassium carbonate, triethanolamine and/or its salts.

According to the variant of the invention, the specific surface of hydraulic cement, determined by the airpermeability method, is not less than 4000 cm²/g.

The named hydraulic cement of improved quality is characterized as well by water content in a paste of normal consistency not over 21.5 weight percent.

The essence of this invention consists in the following. A hydraulic cement proposed contains an organic water demand reducing component of dry modifier in a higher specific quantity just in those dimension fractions of said cement particles. Portland clinker particles in particular, which are usually, i.e. in ordinary Portland cement characterized by the highest water demand and in the first instance start to form, after mixing and reaction with water, the multiwater crystallic hydrate complexes, namely calcium hydroaluminate and hydrosulfoaluminate types which are the most fragile out of all formed cement hydration products, particularly from a fine fraction (less than 10 mkm and in considerable degree from a medium fraction (10–30 mkm). In the composition of this cement the dry modifier is located in and on the said clinker particles fractions but is not located on calcium sulfate particles, except those which are absorbed on the surface of particles of mineral additions. The last, at least, in a first day after mixing of cement with water are not participating in the reactions of formations of the hydration products. Presence of the modifier in big quantities in an area where it is needed for water demand and fragility reduction from the very beginning of the process of hydration products formation excludes participation of the diffusion process and related time factor in the control of mixing water quantity providing for fresh paste, mortar and concrete of any given consistency. This leads to reduction of water demand in the composition of mentioned fresh materials in a greater extent, than is obtainable by introduction of the same quantity of modifier in the composition of the same materials in an aqueous solution.

For instance, using the hydraulic cement in accordance with the invention for making of fresh paste, mortar or concrete of any given consistency in comparison with the same cement without modifier, the water demand will reduce by 25–45%, but if the same quantity of modifier is added in an aqueous solution, just on 18–25%. While, as in the last case, the modifier is needed in big quantities for such water demand reducing pastes, mortars or concretes, and they keep fresh for a long time and harden very slowly, the modifier in the composition of the hydraulic cement according to the invention intensifies the hardening process of these materials and simultaneously reduces their fragility after hardening considerably, i.e., the relation of their flexural strength to compressive strength grows.

It has to be taken into account that calcium sulfate participates in creation of new hydrate formations during the process of hardening of the hydraulic cement only after the dissociation of ions $Ca^{2+}$ and $SO_4^{2-}$ and diffusion of these ions in paste, mortar or concrete liquid phases to surfaces of clinker particles. Consequently calcium sulfate is a covering reagent in the reactions of sulfate-containing new formations created in the hardening of the mentioned materials. That is why calcium sulfate does not need the presence of modifier on the surface of its particles the diffusion process does not leave room for the specific action of the dry modifier, which is diffusionless, or in other words is active on contact. Exactly to provide contact action by the blockage of the most water requiring zones of clinker particles the dry modifier in the composition of the hydraulic cement according to the invention exists in the form of chemosorptive complex, i.e., a surface chemical compound with clinker minerals, namely alite and tetracalcium alumoferrite. Such combination of the clinker and modifier acts directly after mixing with the water on the quantity of the last and directly takes a part in the structure of new hydrate formations, created by the hydraulic cement and characterized by minimum water content, and reduced fragility. Analysis of the hydration process of such a cement with chemosorptive modifier shows that mixing water in this composition is used considerably more effectively, then in previously known compositions because each weight unit of such water creates about 25–40% larger mass of new cement hydrate formations. So, tobermorite with normal gross formula $C_6S_5H_6$ in composition of products of hydration of the suggested cement contains less water—it has composition about $C_6S_5H_4$ as it was established by the data of differential thermal analysis (DTA) of mixes $C_3S$+dry modifier+$H_2O$, prepared after the intergrinding of $C_3S$ and dry modifiers.

Besides that, an organic water reducing component of modifier is bound in the composition of tobermorite in the form of an associate compound which is not extracted from this calcium hydrosilicate after 2 min. boiling in (Na, $K_2$) $CO_3$ aqueous solution fully extracting from any material free organic water reducing components of the modifier.

Free modifier's exothermic effects are not seen as on differential curves of DTA of freshly making hydraulic cement to form its products: pastes, mortars and concretes. It is evidence about reconstruction of the associate anhydrous compound, which exists in the ready hydraulic cement in a clinker-modifier contact zone, into another associate hydrate compound in a composition of tobermorite and other products of hydration of said cement. But in the products of hydration of pastes, mortars and concretes, where the modifier is introduced in the form of a water solution, as chemical analysis so DTA confirm the presence of a free modifier due to its characteristic effects or a weakly bonded, it existing only in the calcium hydroaluminate or in the calcium hydrosulfoaluminate phases of hardening cement.

When calcium sulfate has partially or fully been dehydrated in the process of intergrinding, the dry modifier being in contact forms with an associate compound, which chemically conceals the initial calcium sulfate, protecting it from the usual reagents, used in analytical practice for its determination in cement composition. The impression arises that there is no calcium sulfate in the cement, though it is known, that it has been introduced into the cement composition. In this case to disclose calcium sulfate cover by the modifier it is recommended to ignite this hydraulic cement at 750°–850° C., after which, because of thermal destruction of the modifier contained in the cement composition, calcium sulfate could easily be detected by normal methods of analytical chemistry. If the temperature is not so high for disappearing of the concealing effect, it means that the strength of chemical bonds in the said associated compound is much higher than in pure modifier, which is selfignited at 380°–400° C. in a mechanical mixture (but not in a product of intergrinding) with clinker and calcium sulfate. These experiments show that clinker+modifier reaction, with formation of contact organomineral chemosorptive complexes, really occurs, is mechanoactivating and thermodynamically probable, because the obtained organomineral product is more stable than the initial organic combination.

Considering the mechanism of this reaction to make it clear, how the required distribution of dry modifier by clinker particle has been achieved by the grinding and its absence in other ingredients, when there are no conditions for dehydration of calcium sulfate in the process of intergrinding.

According to data of the experiments on separation of samples taken along the tube type mill in the process of intergrinding of the hydraulic cement chemosorption of the modifier starts mainly on the surface of the fine fraction I of the clinker fractions, because only on this fraction do the calcium and oxygen active centers with high adsorptive potential first appear. At overall specific surface of clinker particles 3500–3800 $cm^2/g$, and fine fraction I of the clinker particles content about 20% and over by the weight of cement, the condition arises that provides 100% probability of each-of-them contact with at least any one surface point of the particles fraction II, under the actions of the grinding bodies actions. Thus, the pairs of friction points are formed, consisting of particles of fine and medium fractions. Moreover one particle of medium fraction participates simultaneously in several pairs of fractions with the particles of fine fraction. In contact zones of the said pairs of friction in a moment of coimpact with the grinding bodies, a chemical reaction begins of the dry modifier's water reducing organic component with calcium and oxygen centers of solid clinker substrate of its surface namely, sulfate-ion of the modifier with the calcium of the surface of the clinker particles; hydrogen bridges of macromolecules of the modifier with the oxygen of the surface of the clinker particles. But at the same time hydroxylic groups, if they are present in the composition of the water reducing component of the modifier, they react as well with the calcium of the surface of the clinker particles. The associate chemosorptive complex of active centers of the surface of the clinker particles with the molecules of the modifier is created. So the continuous process of friction during the coimpacts leads to absorption of the organic molecules of the water reducing component of the modifier and the process of plastic deformation of substrate of the clinker particles, under the external surface of the particles, and to implosion of external modifier into depth of the clinker particles of the fine fraction. The reasons of this phenomenon are the plastic deformation of the fine clinker particles of the final fraction in the contact zone at the coimpacts of the grinding bodies in a mill working volume. The plastic deformation zone occupies the bigger part of the external surface of the fine clinker particles and the value of contact stresses there exceeds the ultimate shear strength of them. Besides that, some medium fraction particles of angular form, especially their emerging angles, due to shear stresses exceeding ultimate values, also "implode" the modifier inside the particles. It is just required because such angular particles of medium fraction are increasing to some extent as well the water demand of the cement. By means of Auger-spectroscopy it was established that the depth of penetration of the modifier into the clinker particles comprises 1.5 to 3 mkm. The smaller figure belongs to the fine fraction I of clinker particles, and the larger, to the medium fraction II, where implosion is less developed. Thus, it is necessary and sufficient to create definite conditions of the intergrinding to have the required stationary distribution of the modifier by the dimensions of the clinker particles in the hydraulic cement composition with fixation of the modifier just on the places where it is most needed: in the zones of the surface of the clinker particles with the maximum adsorptive potential, able to produce maximum water demand of cement at the moment of its mixing with water, and then able to lead to maximum fragility of the materials produced on the base of the hydraulic cement.

To provide said distribution, the necessary condition, as will be evident from the statement above, is formation in the process of intergrinding the pair of fractions between the particles of fine and medium fractions of the clinker ingredients, and as experiments show it is possible only under the definite particle size distribution in the cement, namely under the weight relation of fraction I to fraction II not less than 1:5 and up to 1:1 approximately.

In the presence of water demand reducing component of the modifier, the water requirement and fragility of the cement do not increase, even in the case of the 1:1 value of this relation, though in this case approximately three times more dry modifier is needed (up to 4%) to cover the external surface and the internal active centers of the fine fraction of the clinker particles, having access to the water when the water is mixed with the cement, than is needed for the cement with the first value of said relation. Limitation of dry modifier content in the cement by the value 4 mass percent is reasonable, not only economically (the modifier costs 10 times higher than the clinker) but technically as well.

There exists a maximum allowable quantity of the modifier in cement which is equal to sorptive capacity of the clinker ingredient of said specific surface. If the modifier is in excess of this quantity it remains free in the hydraulic cement. Such free modifier when mixed with the water in the cement, creates obstacles to dissolution of inorganic clinker phases and thus slows down the hardening of the cement. This slow down effect of excessive modifier is revealed to a smaller extent when so-called overgrinding of the cement takes place. In this case, in the process of further grinding of the fine fraction of the clinker particles, the modifier is released directly into the mill in the already processed form as chemosorptive complexes with calcium cations, which were taken by the modifier from the surface of the clinker particles. The experiments show, however, that the fine fraction of the clinker particles in this final stage of grinding is greased by the mono-layer of modifiers from the surface and escapes the impacts of the grinding bodies, and that's why the crushing of the particles of the fine fraction accompanied by the release of part of the modifier according to the presented mechanism, is a rare happening. In this connection the content of free and mechanically processed modifier, comprising calcium and affecting the solubility in water of inorganic part of the cement not so noticeably should not be, though, over 0.2 mass percent to provide an accelerated speed of the cement hardening. The free and not processed modifier content should be even less. Besides that, the content of the modifier in the fine fraction of the clinker particles, imploded during intergrinding, could not be higher than the internal porosity of those particles, which is in the range from 8 to 16%. Having the density of the dry modifier on the average of 0.7 g/cm$^3$, the clinker particles' density, around 3.05 g/cm$^3$, and the part of the volume which might be occupied by the modifier, from 6 to 16%, so the quantity of the modifier could comprise (0.06 to 0.16)×(0.7/3.05)= (0.014 to 0.036) or from 1.4 to 3.6% of the weight of the fine fraction, or from 0.02 to 1.2% of the cement weight. In case of plastic strains in the pairs of fractions, the volume of defects in the fine fraction of the clinker is increased an average on 40%, which leads to required quantity of dry modifier increase up to 0.045–1.7% of the cement weight. The same procedure may be used for the determination of the dry modifier in an intermediate fraction.

The essence of the invention stated above, is confirmed by unexpected phenomena, discovered in the process of work with the cement according to said invention. The first of them is the double heating effect of wetting during its mixing with the water. As it is known in the process of mixing with the water of ordinary known cements there is just one heating effect of wetting, caused by the chemosorption of the water on the surface of the cement particles. When mixing with the water of the suggested cement, a double heating effect is proved by means of the low-inert micro-calorimeter having resolving ability in 1/10, but if in the inert mixing liquid to separate the fine fraction from the cement, so in this case, without the fine fraction the heating effect became single. To explain this phenomenon separation on different fractions was conducted as well as determination of the modifier content using the method of extraction by a hot water solution of (Na, K)$_2$CO$_3$. The extremes of variation of the modifier's content in the fine and intermediate parts of neat clinker cement, as well as in the clinker fractions of the cement, containing mineral ingredients, were established.

It was shown that the dry modifier is not adsorbed on the surface of any type of mineral ingredients and is not contained inside the particles except hemihydrated gypsum and anhydrite, formed in the process of grinding of dehydrated gypsum.

The double heating effect of wetting may be explained on the basis of the obtained data by the fact that in the clinker fines consequently the external (first effect of heat evolution) and the internal (second effect) surfaces of the clinker particles are wetted, but these two effects are fully divided only in the fine fraction, the internal surface of which is occupied fully by the modifier. In the intermediate fraction such division of effects of heat evolution by wetting is not observed because its internal surface is not occupied fully by the modifier, etc.

As a second unexpected phenomenon the alteration of molecular mass of the modifier's organic component during the intergrinding with the remaining cement ingredients may be considered. Let's illustrate this, in particular, for the case of utilization of modifiers, containing a sodium salt of condensate of naphthalenesulfoacid with formaldehyde. In the mechanical mixture of the ingredients and before the grinding the average-number molecular weight of such commercially available modifier is not less than 1500–1800 Dalton, that corresponds to the oligomer comprising 7–9 monomer units. In a ready hydraulic cement after grinding the organic water reducing component of the modifier, as it was established by gel-chromatography, has absolutely different mass-molecular distribution: in parts of the total content of the modifier in the cement, not more than 0.1 of polymer fraction with the molecular weight 2300 Dalton is left (4 times less approximately; 0.3–0.6 of oligomer fraction with the molecular weight 1200–2300 Dalton (1.2–2 times less) and a light fraction with the molecular weight 230–1199 Dalton appears, which was practically absent before grinding. The modifier in the adsorbed state is changing consequently its mass-molecular distribution, and in this particular case in the direction of its lowering, and this is an optimal mass-molecular distribution, obtained as a result of grinding.

Approximately the same way, the way of destruction, in the composition of hydraulic cement the mass-molecular distribution of the modifier with melamine organic water reducing component is changing, and optimal distribution, obtained by the grinding, is characterized in the following way: not more than 0.1 of polymer fraction with the average-number molecular weight over 650 Dalton; 0.4–0.6 of oligomer fraction with average-number molecular weight 350–650 Dalton and 0.3–0.5 of light fraction with the average-number molecular weight 220–349 Dalton. In an opposite direction and in particular in the direction of increasing of the average-number molecular weight, the mass-molecular distribution of the technical lignosulfonates (LST) in the process of intergrinding of the ingredients is changing. It is expressed, first of all, in increasing of the average-number molecular weight up to 19000–25000 Dalton from 12000–18000 Dalton for the technical lignosulfonates before grinding. Here: 1) the first range of molecular weights for the LST is optimal; 2) commercial technical lignosulfonates are rather low in molecular weight and they contain about 0.2 of the mass in the form of a light fraction with the average-number molecular weight up to 5000 Dalton and which is considered as the retarder for the cement's setting and hardening. But the hydraulic cement, by this invention, even in the case of the use of such lignosulfonates for its manufacture, does not contain a light fraction in a finished product absolutely, and this causes a considerable increase of the speed of the cement hardening and especially of its flexural strength. The modifiers of lignosulfonates normally contribute to the increase of their molecular weight as well by diminishing the light refraction. In this particular case, this is achieved "automatically" during the grinding, and by this reason even non-modified technical ligonosulfonates could be used in the composition of said cement. From this the following specific conditions of intergrinding are drawn for the manufacturing of said cement. The clinker, the calcium sulfate and the modifier should be dry, having no more than 3% of moisture by weight, because reaction clinker/modifier on the contact may be substituted by the thermodynamically more preferable reaction clinker/water. Besides that, the clinker shall not comprise a noticeable quantity of glass characterized by low reactivity and sorptive ability in relation to the modifier partially because of the low porosity. The mineral ingredient shall not contain impurities absorbing the modifier or preventing its contact reaction with the clinker. The most known of such impurities is clay, or pelitomorfous fraction of flaky alumosilicates, the quantity of which shall not be more than 7% by weight. If calculated on calcium sulfate it means the possibility of application of low quality gypsum, containing less than 5.0% by weight of clay, or application of loess, in which the quantity of pelite fraction shall not exceed ½.

The temperature of the cement in the process of grinding shall not exceed 140°–160° C., because the process of the modifier's destruction will be intensified from the group (a) and especially from the group (b) as well as the process of polymerization of the modifiers with the organic water reducing components from the group (c). This will increase their air-entraining ability and may decrease the cement's strength, especially early strength.

Mechanical regime of the mill's operation is of prime importance also. The grinding loading shall be selected having in mind the necessity to have the grinding bodies minimal by weight and the necessity of the fast formation of the fine fraction I of the clinker practically at the beginning of the first chamber of the tube mill. Stationary distribution of the modifier along the cement's fractions, mentioned above, needs the consideration of the differences in the speed of movement of this lightweight component along the mill's length of one of the chambers is more than 3–4M the length of free movement of the modifier's particles after the coimpacts of the grinding bodies is increasing too fast and appearance of the modifier's waves in the mill excludes fully the required stationary distribution of the modifier in the cement particles. Free openings in the partitions between the chambers in the tube mills shall be reduced up to 3–4% of the whole partition's area.

From all this follow that it is impossible to get high quality cement without paying attention to all mentioned above circumstances.

But the main consist in the necessity to increase in the process of grinding the surface area the way that to the moment of the first free run of the modifier's particle the pair of friction of the fine and intermediate fractions of the clinker ingredient should exist to absorb those particles of modifier which are activated by the first grinding action. Thus grinding diagram for the tube mill is of prime importance. There is a rule for so-called intermediate size distribution of the clinker ingredient in the process of hydraulic cement manufacturing according to the invention that says: the surface area of grinding material at the outlet of the first chamber of the tube mill shall be by clinker ingredient 2500–2800 $cm^2/g$, and the quantity of modifier in this cross-section of the mill on 1 $cm^2$ of substrate, e.g. clinker particles, shall not be higher than 1.3 $mm^3/cm^2$. This corresponds approximately to 1% by mass (calculated for the organic water reducing component). If for the specific cement 2% of the modifier is required (calculated for the organic water reducing component), so in this specific cross-section of the mill the specific surface area of the clinker component shall be approximately in 1.5 times higher than shown level, keeping in mind the multiplication of the surface defects under the influence of plastic deformations. If 3% of the modifier is required to be introduced (the same way calculated) then the specific surface area in this cross-section of the mill shall be increased in 1.8 times and so on. If those conditions are not taken into account, an excess quantity of the free modifier will be left in the finished product and the quality of the cement will be low. Due to these reasons, the abnormal cement setting found by Guy S. Pairon and discussed in detail in his patent was caused not only by the dehydrated gypsum but also by the free modifier, because the modifier reacts immediately with the gypsum in the process of its dehydration during the grinding. There are no such anomalies in the hydraulic cement according to the invention in spite of the modifier, because it is practically fully bound chemically before the overheating of the gypsum leads to its dehydration.

By this way of grinding the hydraulic cement, according to the invention, unlike the known technical solution several conditions are realized to obtain specific granulometry and distribution of the modifier distribution by fractions that allow to guarantee high quality, and in particular, high strength and reduced fragility of the cement, especially in concretes, where a fixed water-cement ratio or water content is not established beforehand.

The essence of the invention will become more clear from the examples of its realization, stated below.

EXAMPLE 1

This example shows high characteristics of hydraulic cement in which the cement fractions I–III are bonded to corresponding amount of modifier. The chemical and mineralogical composition of the clinkers used are shown in Table 1. Dihydrate gypsum and naphthalenesulfonate-formaldehyde resin were also used. Cements were made by grinding all the constituents in the tube type mill. Steel balls (in chamber I) and cast iron cylinders (in chamber II) were used as grinding bodies. We have obtained different cement samples by changing relation between the weight of the grinding bodies and the time of milling in each chamber. The cement characteristics are shown in Table 2. The molecular-mass characteristics of the modifier are shown in Table 3. The strength properties of the mortars and concretes based on these cements are given in Table 4.

The results given in Table 4 point out the top strength and low fragility obtained by using the cement compositions in accordance with instant invention. These results are achieved due to lower water demand of the cement compositions and alterations of its hydration kinetics that we discussed in this patent description. Comparative samples have water demand more than 20% higher, compressive strength more than 40% lower and fragility more than 25% higher.

EXAMPLE 2

We have made samples of binders having different types of gypsum also, by using the same procedure. Besides, we have used samples of organic water reduced substances characterized by different molecular-mass distribution. Binder compositions and its base physical-chemical properties are given in Tables 5 and 6 as well as test results.

The results given in Table 6 show low water demand and fragility of mortars and concretes that had been made by using cements in accordance with the instant invention. Comparative samples made of the same clinkers had shown next results: by Type I cement—W/C=0.42; slump—18 cm; compressive strength ($R_{com}$)—60.0 MPa; $R_{com}R_{ben}$=1:10; by white cement—W/C=0.34; slump—4 cm; $R_{com}$=42 MPa; $R_{com}/R_{ben}$=1:11. Comparison of comparative samples and samples by the instant invention show a significant advantage in favor of the instant invention.

EXAMPLE 3

We can use mineral additions in the hydraulic cement composition up to 65%. Physical-chemical properties of the obtained binders are shown in Table 7. Mortar and concrete strengths are shown in Table 8. All the samples have high strength characteristics (20% more than comparative ones) and fine fragility (15% less than comparative ones).

EXAMPLE 4

We can use lignosulfonates (LST) as an organic water reducing component. The average-number molecular weight of these LST must in range 19000 . . . 25000 Dalton (se Table 9 and 10).

EXAMPLE 5

By using the same procedure as in Examples 1–4 we have obtained cements in accordance with the instant invention for new types of organic water reducing components and their mixtures, gypsums, active mineral additions and/or fillers. The physical-chemical properties of these cements are given in Table 11. Mortar and concrete strengths are showin in Table 12. All the data point out significant improvement of the mortar and concrete strengths and fragility (about the same scale as previous examples).

The instant invention may be used for the production of many special purpose cements with high strength and low fragility.

In the appended claims, the abbreviation mkm means one micron, which is one millionth of a meter.

TABLE 1

| | | Mineral composition, % by mass | | | |
|---|---|---|---|---|---|
| N | Clinker | $C_3S$ | $C_2S$ | $C_3A$ | $C_4AF$ |
| 1 | Type 1 | 62 | 19 | 9,0 | 12 |
| 2 | White | 56 | 29 | 12 | 3 |
| 3 | Type 2 | 66,7 | 11,9 | 3,2 | 18,2 |
| 4 | Type 2 | 70 | 0,1 | 4,9 | 25,0 |
| 5 | Type 1 | 45 | 20 | 12,0 | 23,0 |
| 6 | Type 1 | 70 | 20 | 0,5 | 9,5 |
| 7 | Type 1 | 69,0 | 17,0 | 17,0 | 4,0 |

TABLE 2

| Number of cement compo-sition | Content of cement, % by mass | | | | | | | | | | | | Specific surface, $CM^2/g$ | Setting time, hour-min | |
|---|---|---|---|---|---|---|---|---|---|---|---|---|---|---|---|
| | Clinker (N3, table 1) | | | | | Gyp-sum | Modifier, content of cement fractions, % by mass | | | | | | | Initial | End |
| | Total | Fraction | | | | | Total | I | II | III | IY | Free | | | |
| | | I | II | III | IY | | | | | | | | | | |
| 1 | 94 | 34,3 | 39,3 | 19,6 | 0,8 | 2 | 4 | 1,65 | 2,1 | 0,05 | — | 0,2 | 5500 | 1–25 | 4–30 |
| 2 | 97 | 15,3 | 77,5 | 4,2 | — | 2,93 | 0,07 | ,045 | 0,02 | 0,05 | — | — | 4000 | 1–30 | 2–00 |
| 3 | 91 | 33,8 | 37,2 | 18,5 | 1,5 | 5 | 4 | 1,7 | 2,1 | 0,2 | — | — | 5000 | 1–15 | 4–10 |
| 4 | 95 | 28,7 | 49,6 | 12,6 | 4,1 | 3,5 | 1,5 | 0,6 | 0,8 | 0,09 | — | 0,01 | 4500 | 0–50 | 2–40 |
| 5 | 91 | 25,4 | 45,6 | 15,15 | 4,85 | 7,0 | 2,0 | 0,7 | 1,19 | 0,01 | — | 0,1 | 4900 | 1–05 | 2–55 |

TABLE 3

Molecular-mass distribution at the organic water reducing component of the modifier (number correspods to number of the table 2)

| Number as in the table 2 | Content of fractions, mass parts | | | Type of salt (metal name) |
|---|---|---|---|---|
| | Light fraction 230 . . . 910 Dahlton | Middle fraction 1200 . . . 2100 Dahlton | Polymer fraction more 2300 Dahlton | |
| 1 | 0,55 | 0,40 | 0,05 | Na |
| 2 | 0,45 | 0,50 | 0,05 | K |
| 3 | 0,60 | 0,30 | 0,10 | Ca |
| 4 | 0,39 | 0,60 | 0,01 | Ca |
| 5 | 0,30 | 0,60 | 0,1 | Mg |

TABLE 4

Characteristics of the hydraulic cement in mortars and concretes
(numbers correspond to numbers of table 2)

| Number as in the table 2 | Water content in the paste of normal consistency | Mortar 1:3 ||| Concrete |||||
|---|---|---|---|---|---|---|---|---|---|
| | | W/C ratio | Slump MM | $R_{co}$, MIIa, 28 days $R_{co}/R_{ben}$ | W/C ratio | Density, kg/M$^3$ | Strengths in 28 days ||| Memo |
| | | | | | | | $R_{co}$,MIIa | $R_{ben}$,MIIa | $R_{co}/R_{ben}$ | |
| 1 | 18,0 | 0,30 | 108 | 122,6 6:1 | 0,29 | 2240 | 151,6 | 24,1 | 6,3:1 | |
| 2 | 22,5 | 0,32 | 110 | 120,5 5:1 | 0,30 | 2230 | 148,2 | 22,1 | 6,7:1 | |
| 3 | 20,0 | 0,29 | 107 | 121,7 5,5:1 | 0,29 | 2240 | 150,0 | 23,8 | 6,3:1 | |
| 4 | 18,5 | 0,31 | 109 | 124,2 5,5:1 | 0,31 | 2250 | 152,9 | 25,9 | 5,9:1 | |
| 5 | 18,0 | 0,30 | 107 | 122,0 5:1 | 0,30 | 2260 | 151,5 | 23,0 | 6,6:1 | |

Concrete matrix (cement:sand:gravel) = 1:1,5:2,1

TABLE 5

Results for testing of the cements containing different types of gypsum.

| N | Type of clinker, its quantity in resultant cement, % | Distribution clinker particles over fractions, % by mass ||||  Type of gypsum, its quantity in % by cement mass | Modifier ||| 
|---|---|---|---|---|---|---|---|---|---|
| | | I | II | III | IV | | Type and quantity in % by binder mass | Quantity of fractions in parts of binder mass ||
| | | | | | | | | Light | Middle | Polimer |
| 1 | Tipe 2;94 | 22,4 | 58,5 | 9,4 | 3,7 | CaSO$_4$ × 2H$_2$O 4,2 | Type 1; 1,8 | 0,3 | 0,6 | 0,1 |
| 2 | " | 15,3 | 54,2 | 19,6 | 4,9 | CaSO$_4$ × 2H$_2$O 4,2 | " | 0,3 | 0,6 | 0,1 |
| 3 | " | 34,3 | 52,1 | 6,2 | 1,4 | Gypsum hemihyd.;4,2 | " | 0,6 | 0,3 | 0,1 |
| 4 | " | 22,0 | 49,3 | 18,9 | 3,8 | Natural gypsum;4,2 | " | 0,5 | 0,5 | — |
| 5 | White;95 | 15,3 | 55,2 | 19,6 | 4,9 | Anhydrate;3,5 | Type 2; 1,5 | 0,3 | 0,6 | 0,1 |
| 6 | White;95 | 15,9 | 72,5 | 4,2 | 2,4 | Phosphogypsum; 3.5 | " | 0,5 | 0,4 | 0,10 |
| 7 | White;94,5 | 34,3 | 37,2 | 19,6 | 3,4 | CaSO$_4$ × 2H$_2$O 3,5 | Type 2; 2,0 | 0,4 | 0,5 | 0,1 |
| 8 | Tipe 2;94 | 25,6 | 50,9 | 15,0 | 2,5 | Mixture of boro- and titanogypsum; 4,0 | Ca-salt of polynaphtalensulfonio acid; 2,0 | 0,5 | 0,45 | 0,05 |

| N | Modifier quantity over cement fractions, % by resultant cement mass |||| Resultant cement properties ||||
|---|---|---|---|---|---|---|---|---|
| | Fraction I | Fraction II | Fraction III | Free | Specific surface, CM$^2$/g | W/C ratio | Initi. set. | End set.. |
| 1 | 0,7 | 0,9 | 0,15 | 0,05 | 4000 | 0,19 | 0–40 | 2–30 |
| 2 | 0,7 | 0,9 | 0,15 | 0,05 | 4200 | 0,20 | 0–50 | 3–10 |
| 3 | 0,05 | 1,7 | 0,05 | — | 4500 | 0,20 | 1–15 | 3–00 |
| 4 | 0,2 | 1,5 | 0,1 | — | 5000 | 0,20 | 1–05 | 2–40 |
| 5 | 0,35 | 1,0 | 0,1 | 0,05 | 5000 | 0,18 | 2–00 | 8–00 |
| 6 | 0,15 | 1,05 | 0,2 | 0,1 | 5200 | 0,17 | 2–15 | 7–10 |
| 7 | 0,9 | 1,05 | 0,05 | — | 5100 | 0,17 | 2–05 | 7–30 |
| 8 | 0,8 | 1,2 | — | — | 5500 | 0,18 | 1–55 | 7–50 |

Type 1: Na salt of the condensate with formaldehyde of products of sulfation of phenantren.
Type 2: Melamen based modifier: light fraction 220 ... 349 Dalton, middle fraction 350 ... 650 Dalton, polimer fraction - more 650 Dalton.

TABLE 6

Test results for mortars and concretes made of binders as in the table 5

| N of the binder as in the table 5 | Mortar 1:3 | | | $R_{ben}$ / $R_{com}$ ×10³ | Concrete mixture and concrete | | | | | |
|---|---|---|---|---|---|---|---|---|---|---|
| | W/C | Slump, mm | Strength in 28 days standard cure, MPa | | W/C | Slump CM | Workability, h | Strength, MPa, 28 days | | |
| | | | | | | | | $R_{com}$ | $R_{ben}$ | $R_{ben}/R_{com}$ |
| 1 | 0,28 | 110 | 118,5 | 145 | 0,36 | 18 | 2,0 | 85,7 | 10,8 | 0,126 |
| 2 | 0.30 | 112 | 117,0 | 150 | 0,35 | 20 | 2,5 | 88,0 | 11,53 | 0,131 |
| 3 | 0,30 | 108 | 116,5 | 153 | 0,35 | 21 | 2,0 | 86,2 | 10,5 | 0,122 |
| 4 | 0,31 | 109 | 121,0 | 162 | 0,36 | 21 | 2,0 | 90,0 | 11,9 | 0,132 |
| 5 | 0,26 | 108 | 62,3 | 128 | 0,31 | 3 | 4,5 | 62,4 | 6,8 | 0,109 |
| 6 | 0,27 | 110 | 64,0 | 131 | 0,30 | 4 | 5,0 | 61,8 | 6,8 | 0,110 |
| 7 | 0,26 | 109 | 63,5 | 130 | 0,31 | 3 | 4,5 | 61,5 | 6,8 | 0,107 |
| 8 | 0,27 | 110 | 66,6 | 127 | 0,31 | 4 | 4,5 | 62,0 | 6,7 | 0,108 |

TABLE 7

| N | N of cement as in the table 2 | Cement, as in table 2, content in the binder, % by mass | Active mineral addition and/or filler content in the binder, % by mass | | Specific surface, $CM^2/g$ | Setting time, hour-min | | Normal consistency of the paste |
|---|---|---|---|---|---|---|---|---|
| | | | Type | Content in the binder, % by mass | | Initial | End | |
| 1 | 2 | 95 | Limestone | 5 | 5500 | 1–10 | 1–50 | 22,7 |
| 2 | 2 | 65 | Slag | 35 | 5000 | 1–40 | 2–20 | 23,2 |
| 3 | 2 | 35 | Sand | 65 | 5500 | 2–15 | 4–05 | 23,8 |
| 4 | 4 | 95 | Marble | 5 | 6000 | 0–50 | 1–55 | 18,5 |
| 5 | 4 | 65 | Fly ash | 35 | 6500 | 1–20 | 2–50 | 18,9 |
| 6 | 4 | 35 | Volcanic ash | 65 | 6500 | 1–50 | 4–15 | 19,8 |
| 7 | 5 | 95 | Loess | 5 | 4000 | 1–30 | 3–15 | 18.1 |
| 8 | 5 | 65 | Trass | 35 | 4500 | 2–00 | 3–40 | 18,4 |
| 9 | 5 | 35 | Tuff | 65 | 7500 | 2–40 | 4–30 | 20,3 |

TABLE 8

Properties of mortars and concretes made from binders by table 7.

| N 1 | N of cement as in the table 7 2 | Properties of mortar 1:3 | | | | | Properties of concrete and concrete mixture | | | | |
|---|---|---|---|---|---|---|---|---|---|---|---|
| | | W/C 3 | Slump mm 4 | $R_{com}$ MIIa 5 | $R_{ben}$ MIIa 6 | $R_{com}/R_{ben}$ 7 | W/C 8 | Slump cm. 9 | $R_{com}$ MIIa 10 | $R_{ben}$ MIIa 11 | $R_{com}/R_{ben}$ 12 |
| 1 | 1 | 0,3 | 109 | 115,0 | 23,0 | 5,0:1 | 0,29 | 2–4 | 145,5 | 22,4 | 6,5:1 |
| 2 | 2 | 0,35 | 110 | 63,4 | 9,6 | 6,6:1 | 0,40 | 2–4 | 82,6 | 13,1 | 6,3:1 |
| 3 | 3 | 0,39 | 110 | 52,2 | 8,0 | 6,5:1 | 0,42 | 2–4 | 69,1 | 11,5 | 6,0:1 |
| 4 | 4 | 0,29 | 108 | 117,1 | 23,9 | 4,9:1 | 0,30 | 2–4 | 151,1 | 26,1 | 5,8:1 |
| 5 | 5 | 0,34 | 109 | 64,1 | 12,1 | 5,3:1 | 0,40 | 2–4 | 83,0 | 13,4 | 6,2:1 |
| 6 | 6 | 0,40 | 108 | 51,0 | 8,0 | 6,4:1 | 0,42 | 2–4 | 68,3 | 11,4 | 6,0:1 |
| 7 | 7 | 0,30 | 108 | 116,3 | 24,2 | 4,8:1 | 0,30 | 2–4 | 150,7 | 23,2 | 6,5:1 |
| 8 | 8 | 0,35 | 108 | 65,9 | 11,6 | 5,7:1 | 0,39 | 2–4 | 83,2 | 13,6 | 6,1:1 |
| 9 | 9 | 0,40 | 110 | 51,7 | 7,9 | 6,5:1 | 0,42 | 2–4 | 68,7 | 10,3 | 6,7:1 |

TABLE 9

| Number of cement compo- sition | Content of cement, % by mass ||||||||||| | Specific surface, $CM^2/g$ | Setting time, hour-min ||
|---|---|---|---|---|---|---|---|---|---|---|---|---|---|---|
| | Clinker ||||| Gyp- sum | Modifier, content of cement fractions, % by mass |||||| | Initial | End |
| | Total | Fraction ||||  | Total | I | II | III | IY | Free | | | |
| | | I | II | III | IY | | | | | | | | | | |
| 1 | 91,0 | 33,0 | 37,2 | 19,0 | 1,8 | 7,0 | 2,0 | 1,0 | 0,6 | 0,2 | — | 0,2 | 5500 | 1–20 | 2–40 |
| 2 | 97,0 | 34,3 | 38,3 | 19,6 | 4,8 | 2,915 | 0,085 | 0045 | 0,02 | 0,01 | — | 0,01 | 4900 | 0–55 | 1–40 |
| 3 | 94,0 | 18,7 | 60,9 | 11,3 | 3,1 | 2,0 | 4,0 | 1,7 | 2,1 | 0,2 | — | — | 4000 | 0–50 | 1–55 |
| 4 | 97,0 | 15,3 | 77,5 | 4,2 | — | 2,05 | 0,95 | 0,25 | 0,55 | 0,1 | — | 0,05 | 4500 | 1–05 | 2–10 |

The modifier used is LST having the next average molecular mass: N1 - 19000 Dalton, N2 - 21000 Dalton, N3 - 23000 Dalton, N4 - 25000 Dalton.

TABLE 10

| N | N of cement as in the table 9 | Properties of mortar 1:3 ||||| Properties of concrete and concrete mixture |||||
|---|---|---|---|---|---|---|---|---|---|---|---|
| | | W/C | Slump mm | $R_{com}$ MIIa | $R_{ben}$ MIIa | $R_{com}/R_{ben}$ | W/C | Slump cm. | $R_{com}$ MIIa | $R_{ben}$ MIIa | $R_{com}/R_{ben}$ |
| 1 | 2 | 3 | 4 | 5 | 6 | 7 | 8 | 9 | 10 | 11 | 12 |
| 1 | 1 | 0,30 | 109 | 119,5 | 23,1 | 5,2:1 | 0,29 | 2–4 | 146,2 | 24,0 | 6,1:1 |
| 2 | 2 | 0,32 | 110 | 118,2 | 22,6 | 5,2:1 | 0,31 | 2–4 | 146,7 | 24,9 | 5,9:1 |
| 3 | 3 | 0,28 | 108 | 120,9 | 23,7 | 5,1:1 | 0,28 | 2–4 | 148,3 | 25,6 | 5,8:1 |
| 4 | 4 | 0,31 | 108 | 121,7 | 24,0 | 5,1:1 | 0,30 | 2–4 | 150,2 | 25,5 | 5,9:1 |

TABLE 11

| N | Clinker part of cement (as 100%) |||| Active mineral addition and/or filler || Accelerator ||
|---|---|---|---|---|---|---|---|---|
| | Clinker || Organic water reducing com- panent (OWRC) || | | | |
| | Type | Content in clin- ker, % by mass | Gypsum Type and content, % by mass | Type | Content, % by mass | Type | Content, % by mass clinker part of cement | Type | Content, in weight ratio to clinker part of cement |
| 1 | I | 95,815 | N.g.,4,1 | A.a. | 0,085 | Slag | 35 | $Na_2SO_4$ | 1:100 |
| 2 | I | 92,1 | P.g.,3,9 | A.n. | 4,0 | Sand | 35 | $K_2SO_4$ | 1:500 |
| 3 | I | 91,0 | H.g.,7,0 | M1 | 2,0 | Ash | 35 | $Na_2CO_3$ | 1:400 |
| 4 | I | 94,2 | B.g.,2,6 | M2 | 3,2 | π1 | 35 | $K_2CO_3$ | 1:150 |
| 5 | I | 96,0 | D.g.,3,5 | M3 | 0,5 | π2 | 35 | TEA | 1:1000 |
| 6 | I | 97,0 | T.g.,2,0 | M4 | 1,0 | π3 | 35 | salt TEA | 1:800 |

Memo: A.a. - OWRC based on Na salt of polyacrilic acid; A.n. - OWRC based on products of polycondensation formaldehyde with alkilnaphthalenesulphoacid; M1 - products of polycondensation threecycle aromatic sulphoacids with formaldehyde; M2 - OWRC based on Ca salt of antrathenesulphuric acid; M3 - mixture of A.k. and LST (25000D) in weight relation 2:1; M4 - mixture of A.a. and M1 in weight relation 1,5:1; N.g. - natural gypsum; P.g. - phosphogypsum; H.g. - hemihydrate gypsum; B.g. - borogypsum; D.g. - dihydrate gypsum; T.g. - titanogypsum; A1 - mixture of tuff and limestone at proportion 5:1, correspondenly; A2 - mixture of trass and feldspare sand at proportion 0,2:1, correspondenly; A3 - mixture of slag, tuff and marble at proportion 2:1:1, correspondenly; TEA - triethanolamine.

TABLE 12

Properties of binders made by table 11, mortars and concretes on their base

| N of the binder as in the table 12 | Resultant cement properties | | | | Properties of mortar 1:3 | | | | | Properties of concrete and concrete mixture | | | |
|---|---|---|---|---|---|---|---|---|---|---|---|---|---|
| | Specific surface, cm²/g | Setting time, hour-min | | W/C ratio % | Slump mm | $R_{com}$ MПa | $R_{ben}$ MПa | $R_{com}/R_{ben} \times 10^3$ | W/C | Slump cm | $R_{com}$ MПa | $R_{ben}$ MПa | $R_{com}/R_{ben}$ |
| | | Initial | End | W/C | | | | | | | | | |
| 1 | 5000 | 1-55 | 3-40 | 23,0 0,34 | 108 | 62,5 | 9,50 | 152 | 0,39 | 2-4 | 81,0 | 10,34 | 7,83 |
| 2 | 5500 | 2-05 | 4-10 | 22,7 0,32 | 109 | 64,8 | 9,66 | 149 | 0,38 | 2-4 | 84,5 | 10,74 | 7,87 |
| 3 | 5500 | 2-30 | 4-00 | 21,0 0,30 | 109 | 65,0 | 8,45 | 130 | 0,36 | 1-3 | 83,0 | 11,69 | 7,10 |
| 4 | 5100 | 1-30 | 3-50 | 22,7 0,32 | 111 | 68,5 | 8,77 | 128 | 0,39 | 1-3 | 85,5 | 12,01 | 7,12 |
| 5 | 5000 | 1-25 | 2-00 | 22,0 0,31 | 110 | 63,0 | 8,32 | 132 | 0,38 | 2-4 | 82,0 | 11,25 | 7,29 |
| 6 | 5000 | 1-30 | 2-15 | 22,5 0,31 | 110 | 64,0 | 8,51 | 133 | 0,39 | 2-4 | 85,0 | 10,72 | 7,93 |

Memo: Concrete matrix (binder:sand:gravel) as in the table 4.

We claim:

1. A composition of hydraulic cement of low water demand and of high product strength and low product fragility, comprising Portland cement clinker, calcium sulfate and a dry modifier containing an organic water reducing component in weight percent ratio ranges of 91 to 97:2 to 7:0.085 to 4, respectively, in which the clinker ingredient contains three fractions I, II and III of particles chemically bonded with the organic water reducing component of the dry modifier and having particle sizes:

I—0.05 to 10 mkm in quantity 15.3 to 34.3 weight percent;

II—10.1 to 30 mkm in quantity 37.2 to 77.5 weight percent;

III—30.1 to 80 mkm in quality 4.2 to 19.6 weight percent; and one fraction IV—more than 80 mkm in quantity less than 4.9 weight percent and free of modifier;

the calcium sulfate comprising a fraction of particles of sizes 0.5 to 15 mkm and free of the modifier;

the dry modifier being chemically bonded with the clinker fractions I, II and III and being contained in each of them in the following quantities:

in fraction I—0.045 to 1.7 weight percent, in fraction II—0.02 to 2.1 weight percent, and in fraction III—0.01 to 0.2 weight percent;

said organic water reducing component being selected from the group consisting of:

a) water soluble alkali and alkaline earth salts of the condensate with formaldehyde of products of sulfation of aromatic compounds;

b) water soluble alkali and alkaline earth salts of products of sulfation and condensation of heterocyclic compounds;

c) water soluble alkali and alkaline earth salts of the products of sulfation of condensed monocyclic aromatic hydrocarbons; and d) water soluble alkali and alkaline earth salts of the products of sulfation of condensed polycyclic aromatic hydrocarbons.

2. The composition of claim 1,
wherein the organic water reducing component consists of an alkali salt or an alkaline earth salt of a condensate of β-naphthalenesulfonic acid with formaldehyde.

3. The composition of claim 2,
wherein the total quantity of said organic component in the cement comprises not over 0.1 of a polymeric fraction of said condensate with an average-number molecular mass over 2300 Dalton, 0.3–0.6 of an oligomeric fraction of said condensate with an average-number molecular mass of 1200–2100 Dalton, and 0.3–0.6 of a light fraction of said condensate with an average-number molecular mass of 230–910 Dalton.

4. The composition of claim 1,
wherein the organic water reducing component consists of an alkali salt or an alkaline earth salt of a sulfomethylised melamine resin.

5. The composition of claim 4,
wherein the total quantity of said organic component in the cement comprises not over 0.1 of a polymeric fraction of said resin with an average-number molecular mass over 650 Dalton, 0.4–0.6 of an oligomeric fraction of said resin with an average-number molecular mass of 350–550 Dalton, and 0.3–0.45 of a light fraction of said resin with an average-number molecular mass of 220–300 Dalton.

6. The composition of claim 1,
wherein the dry modifier comprises an inorganic part including an accelerator of hardening selected from the group consisting of an alkali metal sulfate and a gel-former.

7. The composition of claim 6,
wherein additional accelerator is added into the cement in a weight ratio from 1:100 to 1:1000, respectively.

8. The composition of claim 1,
wherein the dry modifier comprises an inorganic part including an accelerator of hardening selected from the group consisting of sodium sulfate, sodium carbonate, potassium carbonate, triethanolamine and alkali salts thereof.

9. The composition of claim 1,
wherein said Portland cement clinker contains alite, belite, tricalcium aluminate and calcium alumoferrite in the following weight percent ratio ranges: 45 to 70:0.1 to 20:0.5 to 12:8 to 25, respectively.

10. The composition of claim 1,
wherein said Portland cement clinker is white Portland cement clinker.

11. The composition of claim 1,
wherein said calcium sulfate is selected from the group consisting of calcium sulfate dihydrate, calcium sulfate hemihydrate, calcium sulfate anhydrate, mineral gypsum, phosphogypsum, borogypsum, titanogypsum and mixtures thereof.

12. The composition of claim 1,
wherein an additional mineral ingredient is added into the cement in a quantity from 20 to 56% of the cement by weight, said mineral ingredient being selected from the group consisting of:

(a) material including granulated blast furnace slag, fly-ash and fuel slag;

(b) pozzolanic material of volcanic origin including tuff, riolite and trass;

(c) filler material including quartz sand, feldspar sand, limestone, marble and loess; and (d) a mixture of material selected from (a) and (b) and filler material from (c) in a weight ratio from 0.2:1 to 5:1, respectively.

13. A composition of hydraulic cement of low water demand and of high product strength and low product fragility, comprising Portland cement clinker, calcium sulfate and a dry modifier containing an organic water reducing component in weight percent ratio ranges of 91 to 97:2 to 7:0.085 to 4, respectively, in which the clinker ingredient contains three fractions I, II and III of particles chemically bonded with the organic water reducing component of the dry modifier and having particle sizes:

I—0.05 to 10 mkm in quantity 15.3 to 34.3 weight percent;

II—10.1 to 30 mkm in quantity 37.2 to 77.5 weight percent;

III—30.1 to 80 mkm in quality 4.2 to 19.6 weight percent; and one fraction IV—more than 80 mkm in quantity less than 4.9 weight percent and free of modifier;

the calcium sulfate comprising a fraction of particles of sizes 0.5 to 15 mkm and free of the modifier;

the dry modifier being chemically bonded with the clinker fractions I, II and III and being contained in each of them in the following quantities:

in fraction I—0.045 to 1.7 weight percent, in fraction II—0.02 to 2.1 weight percent, and in fraction III—0.01 to 0.2 weight percent;

said organic water reducing component being selected from the group consisting of:

a) an alkali salt or an alkaline earth salt of a lignosulfonate compound;

b) a modification of an alkali salt or an alkaline earth salt of a lignosulfonate compound modified with a carbamide-formaldehyde resin and having an average-number molecular mass of 19000–25000 Dalton; and c) a mixture of said salt of item (a) with an alkali salt or an alkaline earth salt of a condensate of β-naphthalenesulfoacid with formaldehyde in a weight ratio of 1:1 to 1:3.

14. The composition of claim 13,
wherein the clinker particles of fractions I, II and III are covered over their external surfaces by the dry modifier which is chemically bonded with the particles, the clinker particles having structural defects and pores therein, the dry modifier being present in the structural defects and the pores of the clinker particles of fractions I and II.

15. The composition of claim 1,
wherein the clinker particles of fractions I, II and III are covered over their external surfaces by the dry modifier which is chemically bonded with the particles, the clinker particles having structural defects and pores therein, the dry modifier being present in the structural defects and the pores of the clinker particles of fractions I and II.

16. A composition of hydraulic cement of low water demand and of high product strength and low product fragility, comprising Portland cement clinker, calcium sulfate and a dry modifier containing an organic water reducing component in weight percent ratio ranges of 91 to 97:2 to 7:0.085 to 4, respectively, in which the clinker ingredient contains three fractions I, II and III of particles chemically bonded with the organic water reducing component of the dry modifier and having particle sizes:

I—0.05 to 10 mkm in quantity 15.3 to 34.3 weight percent;

II—10.1 to 30 mkm in quantity 37.2 to 77.5 weight percent;

III—30.1 to 80 mkm in quality 4.2 to 19.6 weight percent; and one fraction IV—more than 80 mkm in quantity less than 4.9 weight percent and free of modifier;

the calcium sulfate comprising a fraction of particles of sizes 0.5 to 15 mkm and free of the modifier;

the dry modifier being chemically bonded with the clinker fractions I, II and III and being contained in each of them in the following quantities:

in fraction I—0.045 to 1.7 weight percent, in fraction II—0.02 to 2.1 weight percent, and in fraction III—0.01 to 0.2 weight percent;

said organic water reducing component being selected from the group consisting of:

a) an alkali salt or an alkaline earth salt of a condensate of β-naphthalenesulfonic acid with formaldehyde, b) an alkali salt or an alkaline earth salt of a sulfomethylised melamine resin.

17. The composition of claim 16,
wherein the clinker particles of fractions I, II and III are covered over their external surfaces by the dry modifier which is chemically bonded with the particles, the clinker particles having structural defects and pores therein, the dry modifier being present in the structural defects and the pores of the clinker particles of fractions I and II.

18. The composition of claim 2,
wherein the clinker particles of fractions I, II and III are covered over their external surfaces by the dry modifier which is chemically bonded with the particles, the clinker particles having structural defects and pores therein, the dry modifier being present in the structural defects and the pores of the clinker particles of fractions I and II.

19. The composition of claim 4, wherein the clinker particles of fractions I, II and III are covered over their external surfaces by the dry modifier which is chemically bonded with the particles, the clinker particles having structural defects and pores therein, the dry modifier being present in the structural defects and the pores of the clinker particles of fractions I and II.

20. The composition of claim 16, wherein the dry modifier comprises an inorganic part including an accelerator of hardening selected from the group consisting of an alkali metal sulfate and a gel-former.

* * * * *